US006785744B2

(12) United States Patent
Fairclough et al.

(10) Patent No.: US 6,785,744 B2
(45) Date of Patent: Aug. 31, 2004

(54) MAPPING SCSI MEDIUM CHANGER COMMANDS TO MAINFRAME-COMPATIBLE PERFORM LIBRARY FUNCTION COMMANDS

(75) Inventors: Kenneth Fairclough, Tucson, AZ (US); Douglas William Dewey, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 09/924,874

(22) Filed: Aug. 8, 2001

(65) Prior Publication Data

US 2003/0037184 A1 Feb. 20, 2003

(51) Int. Cl.[7] .................................................. G06F 3/00
(52) U.S. Cl. ............................... 710/5; 710/2; 710/74; 711/114
(58) Field of Search .................... 710/2, 5, 74; 711/114

(56) References Cited

U.S. PATENT DOCUMENTS

| | | | | |
|---|---|---|---|---|
| 4,932,826 A | * | 6/1990 | Moy et al. ................... | 414/277 |
| 5,499,378 A | | 3/1996 | McNeil, Jr. et al. | |
| 5,544,347 A | | 8/1996 | Yanai et al. | |
| 5,623,696 A | | 4/1997 | Johnson et al. | |
| 5,721,880 A | | 2/1998 | McNeil, Jr. et al. | |
| 5,867,648 A | * | 2/1999 | Foth et al. ................... | 395/200 |
| 5,920,695 A | | 7/1999 | Hathorn et al. | |
| 5,925,119 A | * | 7/1999 | Maroney ..................... | 710/126 |
| 5,960,216 A | | 9/1999 | Vishlitzky et al. | |
| 5,996,024 A | | 11/1999 | Blumenau | |
| 6,006,295 A | | 12/1999 | Jones et al. | |
| 6,031,798 A | * | 2/2000 | James et al. .................. | 369/34 |
| 6,038,605 A | | 3/2000 | Vishlitzky | |
| 6,064,635 A | * | 5/2000 | Machiguchi ................. | 369/34 |

FOREIGN PATENT DOCUMENTS

| | | |
|---|---|---|
| JP | 11282629 | 10/1999 |
| WO | WO 98/33113 | 7/1998 |
| WO | WO 99/03098 | 1/1999 |

OTHER PUBLICATIONS www.ibm.com, "Enterprise Automated Tape Library".*

\* cited by examiner

*Primary Examiner*—Jeffrey Gaffin
*Assistant Examiner*—Alan Chen
(74) *Attorney, Agent, or Firm*—Dale M. Crockatt; Dillon & Yudell LLP

(57) ABSTRACT

Emulation of a small computer system interface (SCSI) library storage is provided in a virtual data storage subsystem having an automated tape library. This allows the ability to access or store a logical volume of data. Medium changer commands as used in SCSI and other open system interfaces are mapped to library function commands as commonly used in an enterprise server environment. This allows full transparent usage of virtual tape storage available in the enterprise server environment as open system storage.

30 Claims, 4 Drawing Sheets

MAPPING SCSI MEDIUM CHANGER COMMANDS TO MAINFRAME-COMPATIBLE PERFORM LIBRARY FUNCTION COMMANDS

BACKGROUND OF THE INVENTION

1. Technical Field

The present invention relates to computer systems with automated tape libraries and virtual tape storage, and more particularly to computer systems emulating the Small Computer System Interface to access those virtual tape devices.

2. Description of the Related Art

In a multiserver/multiprocessor architecture, such as an IBM® Enterprise class system, it is a common practice for a storage subsystem providing one method of access, such as an ESCON® interface, to emulate or provide an additional method of access, such as the Small Computer System Interface (of SCSI) standard. This is done to allow use of the storage subsystem by Open System file servers.

In the case of a tape server using automated tape libraries, this type of additional method of access has only been partially provided. The open system file servers access the tape drives via the standard SCSI interface. However, the medium changer commands of the SCSI interface have not been, so far as is known, emulated or supported. Instead, in place of issuing standard SCSI medium changer commands, the open system file server or host would have to issue Perform Library Function commands, as found in the ESCON® interface, via a second connection to the virtual tape server subsystem. This arrangement did not fully emulate the SCSI interface of a tape library and was not easily incorporated in the Open system computer operating code or applications.

A typical prior art Open System for computers is shown in FIG. 1 having an Open System host computer 2 in the form of a conventional workstation or file server of any suitable type. Host computer 2 is attached to send Small Computer System Interface (SCSI) tape commands over a SCSI bus as indicated at 4 to a virtual tape server 6 of a tape library 8. The virtual tape server 6 performs tape drive commands received from SCSI bus 4 to logical tape drives on logical volume managed by the entire system 8.

Tape library commands, also know as medium changer commands, on the other hand, from the host workstation 2, so far as is known, have not been transferable over the SCSI bus 4 through the server 6 to the library manager 12. Instead, tape library commands have been transferred to the tape library module 12 over a separate path 10, typically through a local area network (LAN), over an RS-232 connection, or other known, conventional computer interconnection network. As has been set forth above, this technique for access to virtual data storage emulating SCSI devices does not fully emulate the SCSI interface. Further, this configuration is complicated, and its use with high availability versions of virtual tape server or VTS has been difficult. It would thus be desirable to allow an Open System host computer to attach to automated data library through a single SCSI attachment as if it were in effect using a true SCSI tape library.

SUMMARY OF THE INVENTION

It is therefore an object of the invention to provide a method and system for converting medium changer commands from a small computer system interface or SCSI bus to formats acceptable to automated tape library commands.

It is another object of the invention to provide a method and system for converting medium changer commands from an open system attached computer over a small computer system interface or SCSI bus to formats acceptable to data storage media from an automated data library.

It is still another object to provide a method and system for emulating a small computer system interface type memory device in an open system attached computer with data storage media from an automated data library under control of a library manager.

It is still another object to a method for emulating a small computer system interface type memory device in an open system attached computer with data storage media from an automated data library under control of a library manager.

The above and other objects are achieved as is now described. A method and system are provided that emulate a SCSI Medium Changer device in a host computer communicating with an automated data library over a small computer system interface or SCSI bus. The computer communicates with storage media of an automated data library under control of a library manager in the automated data library. According to the present invention medium changer commands are provided over the small computer system interface from the personal computer to a tape server of the automated data library. The medium changer commands are then mapped to commands compatible with the library manager of the automated data library and then provided to the library manager. The present invention thus allows an open system host to attach with a single SCSI attachment as if the host were using a true SCSI tape library. The present invention also allows open system attachment to tape controllers of multiple tape systems.

The foregoing and other objects and advantages of the present invention will be apparent to those skilled in the art, in view of the following detailed description of the preferred embodiment of the present invention, taken in conjunction with the appended claims and the accompanying drawings.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
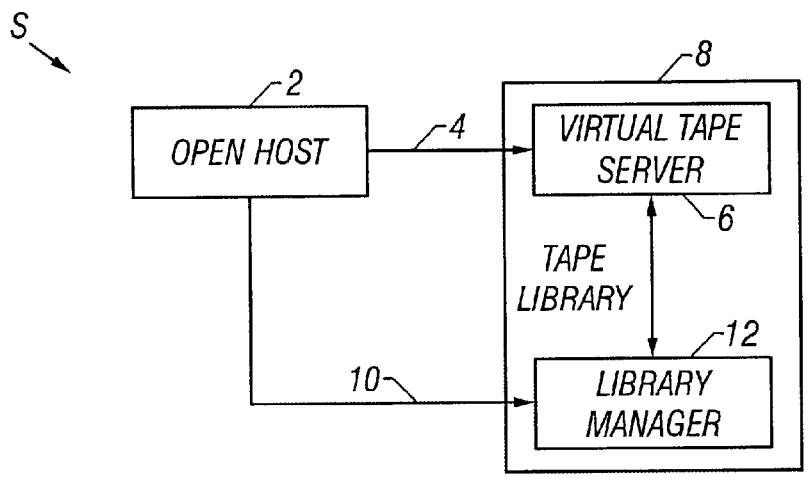
FIG. 1 is a block diagram of a prior art computer system with an open system host having virtual data storage from an automated tape library according to the prior techniques.

With reference now to the figures and in particular with reference to FIG. 1, there is depicted a pictorial representation of a data processing system S with which the present invention may advantageously be utilized. A typical prior art Open System for computers is shown in FIG. 1 having an Open System host computer 2 in the form of a workstation or personal computer of any suitable type. Host computer 2 is attached to send Small Computer System Interface (SCSI) tape commands over a SCSI bus as indicated at 4 to a virtual tape server 6, such as a virtual tape server of an IBM Model 3494 automated tape library 8. The virtual tape server 6 emulates the SCSI tape commands by performing operations on logical tape volumes. SCSI move medium commands are not emulated and instead using Open System host 2 sends Perform Library Function commands over connection 10 to library manager 12 to mount and unmount logical volume.

Figure 2:
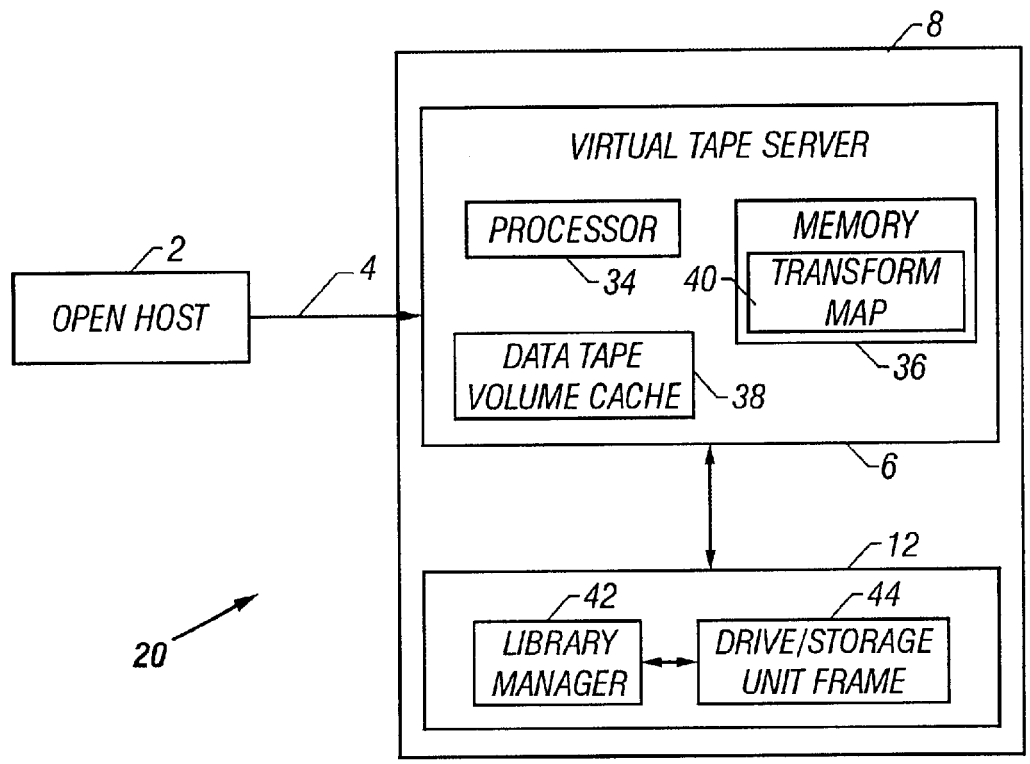
FIG. 2 is a block diagram of a computer system according to the present invention.

FIG. 2 depicts a representative hardware environment of data processing system 20 according to the present invention. In FIG. 1 and FIG. 2, like parts are identified by like numbers. Open system host computer 2 in FIG. 2 may be any computer system acting as a SCSI Initiator on SCSI Bus 4 sending SCSI tape commands and SCSI Mover Medium commands to the VTS system 6.

The virtual tape server 6 in the preferred embodiment of data processing system 20 is an IBM Model 3494 virtual tape server containing a processor 34 operating under conventional instructions from memory 36. The processor 34 transfers data between the automated data library 8 and the host computer 2 over the SCSI bus. A data tape volume cache 38 in the virtual tape server 6 receives the data transferred between the host computer 2 and the virtual tape server 6. The data tape volume cache 38 comprises a suitable number of disk arrays, typically configured as a Redundant Array of Independent Disks or RAID, to cache data under control of program instructions from memory 36. If desired, data compression may be performed in data tape volume cache 38.

The automated tape library 8 also receives medium changer commands in SCSI format from host computer 2 over SCSI bus 4. Memory 36 also contains a stored transform map 40 which translates the SCSI format medium changer commands into a format compatible with the tape library manager 12 of the automated data library 8.

The tape library manager 12 includes a library manager module 42 and a drive/storage unit frame 44. The virtual tape server 6 uses the library manager 42 to perform logical mounts and unmounts of data or media. Preferably ESCON® level Perform Library Function commands are used to transfer data to or from the tape drives 44. ESCON® is an attachment protocol used by memories in multiple processor systems with hierarchical processing level such as IBM System 390 environments.

The library manager module 42 manages moves of media to and from the drive 44, and also manages moves, as will be described, of either virtual or logical volumes or media to or from the logical drives. The drive/storage unit frame 44 contains a number of permanent data storage units including tape drives and, if desired, a number of cartridge cells. The library manager 42 controls the accessing of tapes and cartridges, placements of cartridges, movement of cartridges in the driver/storage unit frame 44. The permanent data storage components located in drive/storage unit frame retain the data transferred over the SCSI bus for use as backup data, archival data, batch processed data or for subsequent retrieval and processing.

The ESCON® interface provides the capability of assigning a cartridge to a category. The category is an integer value that is associated with the cartridge. The cartridge is said to "belong to" that category. Typically many cartridges are placed in the same category (i.e., all assigned the same value for their category). The category is an arbitrary integer attribute or property that may be assigned to a volume and maintained by the library 8.

Some of the "category" operations in ESCON® are:

The PLF-Mount and PLF-Demounts can specify changing a volume category on completion of the operation.

The PLF-Mount can specify that the library should select the next volume from a category and mount it (this is inplace of being told what particular volume to mount)

PLF-LSVC—(Library Set Volume Category)—is a subcommand of the PLF command that indicates the category value to be assigned to a volume PLF-PRSD—(Prepare for Read Subsystem Data)—is a subcommand of the PLF command that can be used to retrieve the category value for a single volume (as specified by sending the volume name to the library) or can be used to retrieve a list of volumes (by their volume name) that are category value set to the value of the category specified)

The SCSI interface does not provide for use or assigning of category. The SCSI interface commands are at a "lower" level than the ESCON® commands. The SCSI interface commands essentially tell the library to move from a specific location (identified by an "element" number, or just "element" for short) to another specific location. These locations can be storage slots within the library, an IO station for removing or putting in media, or an actual drive. A move to a drive becomes a "Mount" and move from a drive is an "Unmount."

The "level" of the ESCON® commands are higher in that the invoking system basically requests the "Mount" of a particular Cartidge and the hardware itself tracks the location of that cartridge and explicitly moves it to a drive. The particular command used to cause this is "Perform Library Function" (PLF). The parameters to the PLF command indicate if a mount or unmount is to be performed as well as various other functions.

In the ESCON® environment the library tracks the location of the particular volumes. In the SCSI interface environment the using system must track the location of the particular volumes.

In the SCSI interface environment a single command is used to "move" media between slots, slots to drives, drive to slots, slots or drives to I/O station. The SCSI interface indicates each of these locations using the "element" and no distinction is made in the move command i.e. "Move" says move from one element location to a next.

In the ESCON® interface via subcommands of the PLF command the following are used:

Command: PLF Subcommand: Mount—moves a media from a slot to a drive: however, the command does not indicate a source slot, it only indicates a volume name or a category indication. If it is a category indication, the library selects the volume to be mounted. The interface does not make visible the location (slots or otherwise) of a volume and then determines which slot it is to be placed in.

There is no command to move a volume from one slot to another (as there is in SCSI).

SCSI commands are synchronous, i.e. A "move(exchange medium)" returns only when the physical movement of the media is complete. In the ESCON® environment (by using the PLF command and its subcommand "mount" or "demount") the command is asynchronous, i.e. It returns immediately and an asynchronous message is sent by the library at a later time to indicate that the move/mount has completed.

Considering the transform map 40 of virtual tape server 6 more in detail, the medium changer commands from the SCSI bus 4 are associated with commands in a language, typically PLF or Perform Library Function commands of the type discussed above, compatible with the operation of the library manager 42. The mapping in transform map 40 is defined according to the following guidelines or elements:

(a) Each SCSI drive address is associated with a distinct VTS logical tape drive address (b) Each SCSI picker address is associated with a distinct VTS logical tape drive address (c) Mounts to or from a drive, though issued to the SCSI Picker address, are performed on the associated VTS drive address for the SCSI drive.

(d) Moves between slots, which are issued to the SCSI picker address, are performed on the associated VTS drive address for the picker (e) A SCSI physical tape cartridge is associated with a unique VTS logical tape volume (f) Each SCSI element (corresponding to a location a physical cartridge may be at) is associated with a distinct Tape Category (g) Moves of cartridges between element locations in the virtual SCSI library are accomplished by changing the Category of the VTS logical tape volumes (and associated mounts, etc.)

(h) The SCSI volume tag is simply the VTS logical Tape volume name

More specifically, the following table presents more detail on the primary medium changer commands and how they are emulated according to the present invention in the Perform Library Function or PLF format acceptable the components of the library manager 42:

| SCSI Hardware | ESCON ® Actions to Emulate |
|---|---|
| Presence of N blank Tape cartridges available for use outside the Library | Create N logical volumes in the Insert Category |
| Operator placing a tape cartridge in the IO station | LSVC (Library Set Volume Category) a logical tape volume from Insert Category to the category for IP station |
| Operator removing a tape cartridge from the IO station | LSVC the volume in IO station category to Export Category |
| Picker movement (address P) from IO or slot cat to IO or slot cat | Check categories for vol collisions, on VTS_addr(P) LSVC volume from Category for source location to category for destination location. |
| Picker command (on address P) to mount from slot to drive (with drive addr D) | Check categories for vol collisions, On VTS_addr(D) perform Category mount from source element category with completion setting volumes category to category for drive element |
| Picker command (on address P) to unmount from drive (addr D) to slot | Check categories for vol collisions, On VTS_addr(D) perform Unmount from drive setting category of volume to category for slot on completion |
| Read Element Status queries | Read equivalent Volume category info to build response |
| Read of Volume Tag for cartridge at a location | Return the Logical Volume name of the volume in the corresponding category |

The present invention emulates the location of a cartridge (SCSI Element) by mapping it to a property of the cartridge (ESCON® Category). The category would normally be used as a Media Pool, or Storage Class or some other way to group multiple pieces of media together. The present invention uses this property to represent the location of a cartridge within an emulated library.

Figure 4A:
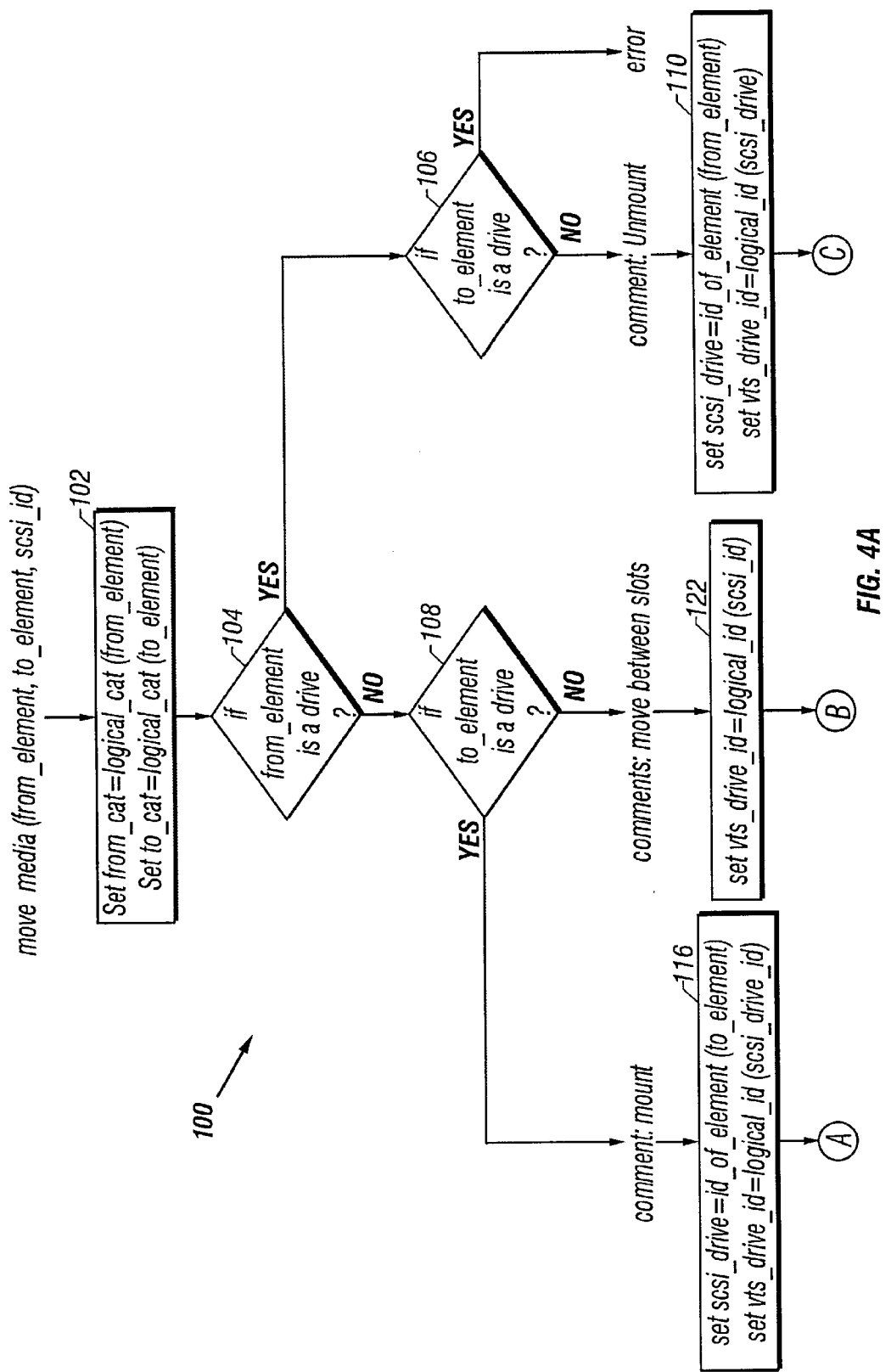
FIGS. 4A and 4B are, taken together, a flow chart indicating the operation of a computer system according to the present invention.
Figure 4B:
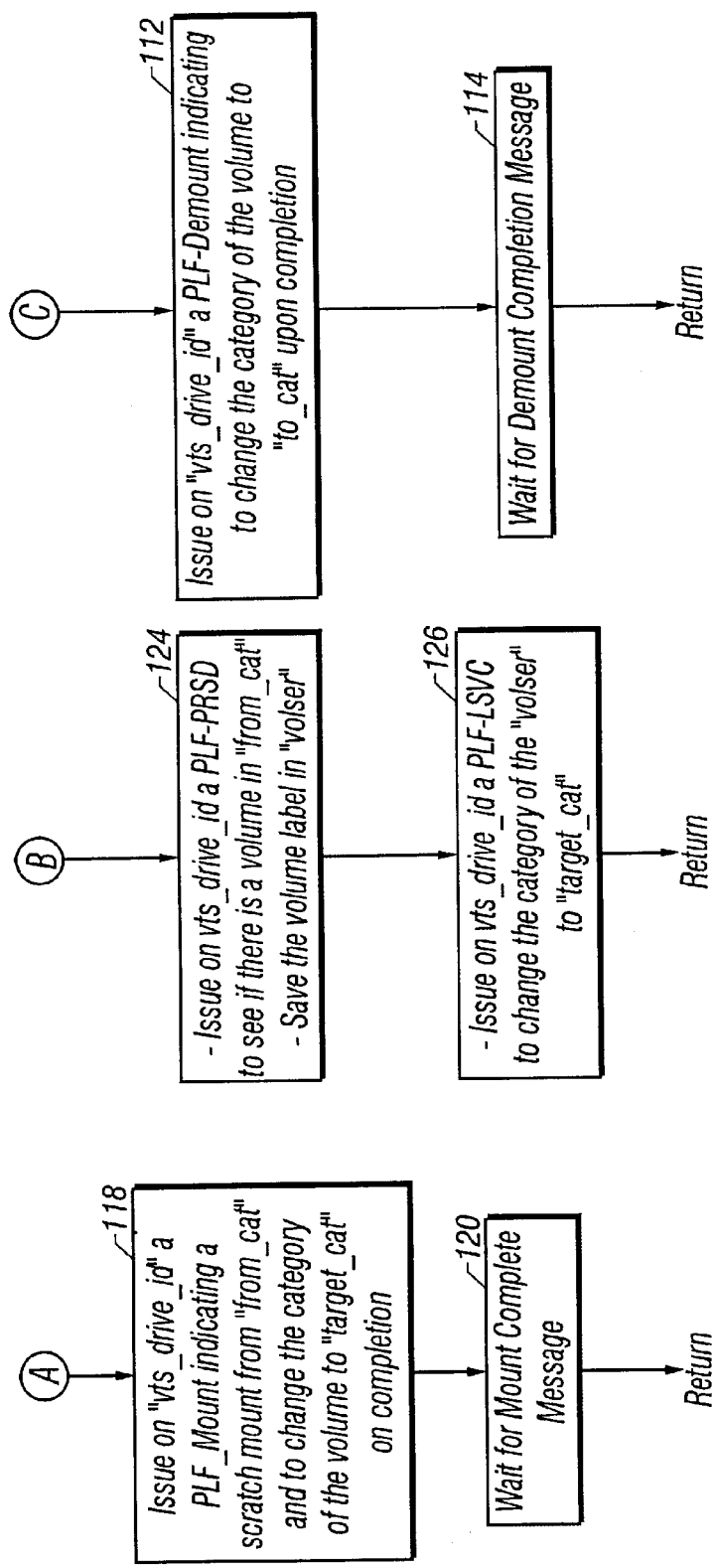

Flow chart 100 of FIGS. 4A and 4B illustrate performance of a SCSI medium changer command in the form of a move_media command, containing as addresses a from_element, a to_element and an identifier number for a particular small computer system interface. The move_media command is an example SCSI medium changer command and instructs the tape library 8 to move or mount a portion of data or information, also termed media in the present disclosure.

First, in step 102 the from and to categories are set to equal the logical categories of the from and to elements, respectively.

Next step 104 determines if the from_element is a drive. If this is the case, the next step is step 106. If the from_element is determined not to be a drive in step 104, the next step is step 108.

Step 106, in response to a determination that the from element is a drive, determines if the to_element is also a drive. If this is the case, an error condition is present, and such an indication is sent. If step 106 determines that the from element is not a drive, an unmount SCSI command is required, and in step 110, the SCSI drive identifier is set to the identifier of the from element and the VTS drive identifier is set to the identifier for the SCSI drive identifier.

Next, during step 112 (FIG. 4B) a PLF_Demount command is issued on the identified VTS drive, indicating that the category of the to_category is to be changed upon completion of such a demount. Then during step 114, library manager 42 waits for receipt of a message indicating completion of the demount operation. At completion of such a demount operation, a return operation is performed and library manager 42 proceeds to the next task awaiting performance.

As noted, step 108 is reached if step 104 determines that the from element is not a drive. In such a case, step 108 determines if the to_element is a drive. If this is the case, a mount command is present, and such an indication is sent. In step 116, the SCSI drive identifier is set to be the identifier of the to_element and the VTS drive identifier is set to that of the SCSI drive identifier.

Next, during step 118 (FIG. 4B) a PLF Mount command is issued on the identified VTS drive, a scratch or remove PLF operation is performed on the location identified in the "from_category" and that the category of the volume is to be changed to that of "target_category" open completion. Next, during step 120, library manager 42 waits for receipt of a message indicating completion of a mount operation. On such completion, a return is performed and library manager 42 proceeds to the next task awaiting performance.

If step 108 (FIG. 4A) determines that the identified to_element is not a drive, a move between slots command is present. During step 122, the VTS drive identifier is set to the logical identifier of the SCSI identified by the move_media command. Then, a step 124 (FIG. 4B) occurs and a PLF command PLF_PRSD is issued to the identified VTS drive to see if a volume is present in the from_cat. The volume label is also saved in a location designated "volser." Thereafter, a step 126 is performed during which a PLF command PLF_LSVC is issued to change the category of the volume label saved in location "volser" to a "target_cat" category. After step 126, library manager 42 proceeds to the next task awaiting performance.

Thus, with the present invention, the Open System host computer 2 is attached to the automated data library 8 over the SCSI bus 4 through that single attachment. The host computer 2 is able to transfer drive commands, and library commands in the form of medium changer commands, over the SCSI bus 4 to the automated data library 8 as if host computer 2 was using a true SCSI tape library. The medium changer commands over the SCSI bus are transformed or connected to formats acceptable to the automated data library 8. The drives in the data library may be either virtual drives or logical drives according to the present invention, and the volumes may be either logical volumes or virtual volumes, as well.

It should be understood that according to the present invention, small computer system interface or SCSI refers to that used by Windows® systems and the Unix® variants as well as other systems. Such systems which use the SCSI protocol to attach peripheral devices (hard disks, tape drives, tape libraries, etc.) are referred to in the present disclosure as "Open Systems Hosts." In the context of the present invention SCSI should also be understood as referring to the new "Fiber" protocol(s) which use the same SCSI commands over a different hardware connection protocol. These systems would also be referred to as Open System Hosts and the present invention would directly apply. When a SCSI Move Medium command is received in Virtual Tape Server 6 over SCSI bus 4, it is translated to an ESCON® Perform Library function command for sending to the library manager module 42. In this manner, the automated data library 8 appears to be a SCSI attached library, receiving both SCSI tape commands and SCSI move medium commands over the SCSI bus 4.

Figure 3:
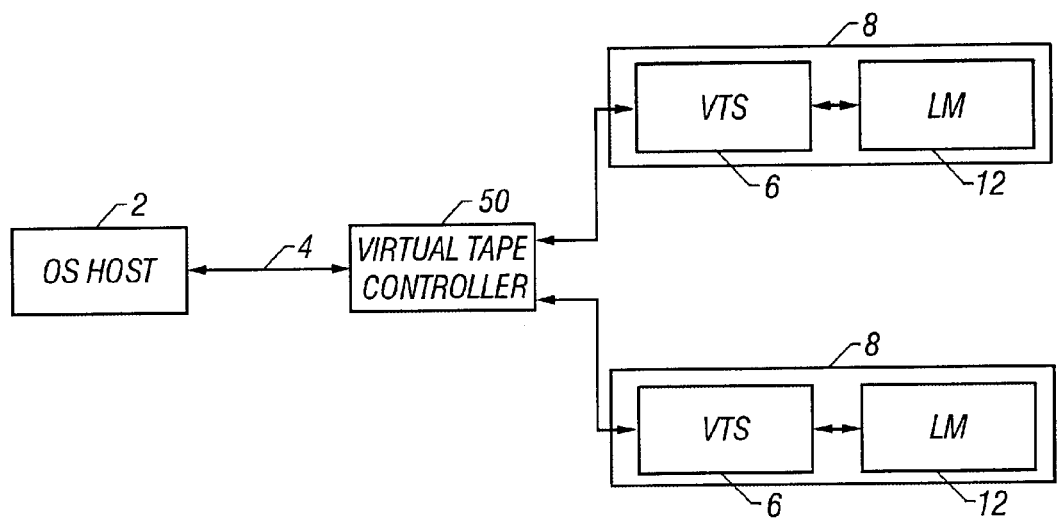
FIG. 3 is a block diagram of a computer system according to a further embodiment of the present invention.

The present invention also is adapted for use with other forms of automated tape library systems, such as shown in FIG. 3. In FIG. 3, like part to FIG. 1 and FIG. 2 are identifiably like numbers. The host computer 2 is connected over a communication link, which may be the SCSI bus 4 or a fiber link, to a virtual tape controller 50. The virtual tape controller 50 is in turn connected over either an ESCON® or FICON™ link to a pair of automated tape libraries like those of FIG. 2, containing transform maps according to the present invention. In a like manner, the present invention may also be used with automated data libraries 8 configured in a Peer-to-Peer virtual Tape server configuration of the conventional type.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for emulating a small computer system interface type memory device in a personal computer with data storage media from an automated data library of a tape server under control of a library manager of the automated data library, comprising the steps of:

providing medium changer commands over a small computer system interface bus between the personal computer and the tape server wherein said medium changer commands comprise an indication of the presence of a specified number of blank tape cartridges on the small computer system interface bus;

transforming the medium changer commands from the personal computer to commands compatible with the library manager to create an identical number of logical volumes from an available memory pool in the tape server; and providing the transformed medium changer commands to the library manager.

2. The method of claim 1, wherein the medium changer command is an indication of placing a memory cartridge in a slot of the small computer system interface bus and said step of transforming comprises transforming said indication to a command to set a logical tape volume from an available memory pool in the tape server for the placed memory cartridge.

3. The method of claim 1, wherein the medium changer command is an indication of removing a memory cartridge in a slot of the small computer system interface bus and said step of transforming comprises transforming said indication to a command to set a logical tape volume from an export memory pool in the tape server for the removed memory cartridge.

4. The method of claim 1, wherein the medium changer command is an indication of moving data from a picker location on the small computer system interface bus and said step of transforming comprises transforming said indication to a command to assign an available memory pool in the tape sewer at a specified address as a destination location pool for the data.

5. The method of claim 1, wherein the medium changer command is an indication of mounting data to a picker location on the small computer system interface bus and said step of transforming comprises transforming said indication to a command to mount the data in a logical tape volume from an available memory pool beginning at a specified address in the tape server.

6. The method of claim 1, wherein the medium changer command is an indication of mounting data to a picker location on the small computer system interface bus and said step of transforming comprises transforming said indication to a command to mount the data in a logical tape volume from an available memory pool beginning at a specified address in the tape server.

7. The method of claim 1, wherein the medium changer command is an indication of an inquiry to read a volume tag at a specified location in memory on the small computer system interface bus and said step of transforming comprises transforming said indication to a command to read a logical volume name from an associated memory location in the tape server.

8. A computer system having a host personal computer communicating over a small computer system interface bus with storage media of an automated data library under control of a library manager of the automated data library, said computer system emulating a small computer system interface type memory device for the host personal computer, and said computer system further comprising:

means for providing medium changer commands over a small computer system interface bus between the personal computer and the tape server wherein said medium changer commands comprise an indication of the presence of a specified number of blank tape cartridges on the small computer system interface bus;

means for transforming the medium changer commands from the personal computer to commands compatible with the library manager to create an identical number of logical volumes from an available memory pool in the tape server; and means for providing the transformed medium changer commands to the library manager.

9. The computer system of claim 8, wherein the medium changer command is an indication of placing a memory cartridge in a slot of the small computer system interface bus and said means for transforming comprises means for transforming said indication to a command to set a logical tape volume from an available memory pool in the tape server for the placed memory cartridge.

10. The computer system of claim 8, wherein the medium changer command is an indication of removing a memory cartridge in a slot of the small computer system interface bus and said means for transforming comprises means for transforming said indication to a command to set a logical tape volume from an export memory pool in the tape server for the removed memory cartridge.

11. The computer system of claim 8, wherein the medium changer command is an indication of moving data from a picker location on the small computer system interface bus and said means for transforming comprises means for transforming said indication to a command to assign an available memory pool in the tape server at a specified address as a destination location pool for the data.

12. The computer system of claim 8, wherein the medium changer command is an indication of mounting data to a picker location on the small computer system interface bus and said means for transforming comprises means for transforming said indication to a command to mount the data in a logical tape volume from an available memory pool beginning at a specified address in the tape server.

13. The computer system of claim 8, wherein the medium changer command is an indication of mounting data to a picker location on the small computer system interface bus and said means for transforming comprises means for transforming said indication to a command to mount the data in a logical tape volume from an available memory pool beginning at a specified address in the tape server.

14. The computer system of claim 8, wherein the medium changer command is an indication of an inquiry to read a volume tag at a specified location in memory on the small computer system interface bus and said means for transforming comprises means for transforming said indication to a command to read a logical volume name from an associated memory location in the tape sewer.

15. A computer program product stored in signal bearing media for emulating a small computer system interface type memory device in a personal computer with virtual data storage media from an automated data library of a tape server under control of a library manager of a mainframe computer, said computer program product comprising:

means for providing medium changer commands over a small computer system interface bus between the personal computer and the tape server wherein said medium changer commands comprise an indication of the presence of the specified number of blank tape cartridges of the small computer system interface bus;

means for transforming the medium changer commands of the personal computer to commands compatible with the library manager to create an identical number of logical volumes from an available memory pool in the tape server; and means for providing the transformed drive commands and library commands to the library manager.

16. A method for emulating a small computer system interface type memory device in a personal computer with data storage media from an automated data library of a tape server under control of a library manager of the automated data library, comprising the steps of:

providing medium changer commands over a small computer system interface bus between the personal computer and the tape server wherein said medium changer commands comprise an indication of an inquiry to read element status of a volume of a memory in a slot in the small computer system interface bus;

transforming the medium changer commands from the personal computer to commands compatible with the library manager to read a logical tape volume of substantially identical size from an available memory pool in the tape server; and providing the transformed medium changer commands to the library manager.

17. The method of claim 16, wherein the medium changer command is an indication of placing a memory cartridge in a slot of the small computer system interface bus and said step of transforming comprises transforming said indication to a command to set a logical tape volume from an available memory pool in the tape server for the placed memory cartridge.

18. The method of claim 16, wherein the medium changer command is an indication of removing a memory cartridge in a slot of the small computer system interface bus and said step of transforming comprises transforming said indication to a command to set a logical tape volume from an export memory pool in the tape server for the removed memory cartridge.

19. The method of claim 16, wherein the medium changer command is an indication of moving data from a picker location on the small computer system interface bus and said step of transforming comprises transforming said indication to a command to assign an available memory pool in the tape server at a specified address as a destination location pool for the data.

20. The method of claim 16, wherein the medium changer command is an indication of mounting data to a picker location on the small computer system interface bus and said step of transforming comprises transforming said indication to a command to mount the data in a logical tape volume from an available memory pool beginning at a specified address in the tape server.

21. The method of claim 16, wherein the medium changer command is an indication of mounting data to a picker location on the small computer system interface bus and said step of transforming comprises transforming said indication to a command to mount the data in a logical tape volume from an available memory pool beginning at a specified address in the tape sewer.

22. The method of claim 16, wherein the medium changer command is an indication of an inquiry to read a volume tag at a specified location in memory on the small computer system interface bus and said step of transforming comprises transforming said indication to a command to read a logical volume name from an associated memory location in the tape server.

23. A computer system having a host personal computer communicating over a small computer system interface bus with storage media of an automated data library under control of a library manager of the automated data library, said computer system emulating a small computer system interface type memory device forte host personal computer, and said computer system further comprising:

means for providing medium changer commands over a small computer system interface bus between the personal computer and the tape server wherein said medium changer commands comprise an indication of an inquiry to read element status of a volume of memory in a slot of the small computer system interface bus;

means for transforming the medium changer commands from the personal computer to commands compatible with the library manager to read a logical tape volume of substantially identical size from an available memory pool in the tape server; and means for providing the transformed medium changer commands to the library manager.

24. The computer system of claim 23, wherein the medium changer command is an indication of placing a memory cartridge in a slot of the small computer system interface bus and said means for transforming comprises means for transforming said indication to a command to set a logical tape volume from an available memory pool in the tape server for the placed memory cartridge.

25. The computer system of claim 23, wherein the medium changer command is an indication of removing a memory cartridge in a slot of the small computer system interface bus and said means for transforming comprises means for transforming said indication to a command to set a logical tape volume from an export memory pool in the tape server for the removed memory cartridge.

26. The computer system of claim 23, wherein the medium changer command is an indication of moving data from a picker location on the small computer system interface bus and said means for transforming comprises means for transforming said indication to a command to assign an available memory pool in the tape server at a specified address as a destination location pool for the data.

27. The computer system of claim 23, wherein the medium changer command is an indication of mounting data to a picker location on the small computer system interface bus and said means for transforming comprises means for transforming said indication to a command to mount the data in a logical tape volume from an available memory pool beginning at a specified address in the tape server.

28. The computer system of claim 23, wherein the medium changer command is an indication of mounting data to a picker location on the small computer system interface bus and said means for transforming comprises means for transforming said indication to a command to mount the data in a logical tape volume from an available memory pool beginning at a specified address in the tape server.

29. The computer system of claim 23, wherein the medium changer command is an indication of an inquiry to read a volume tag at a specified location in memory on the small computer system interface bus and said means for transforming comprises means for transforming said indication to a command to read a logical volume name from an associated memory location in the tape server.

30. A computer program product stored in signal bearing media for emulating a small computer system interface type memory device in a personal computer with virtual data storage media from an automated data library of a tape server under control of a library manager of a mainframe computer, said computer program product comprising:

means for providing medium changer commands over a small computer system interface bus between the personal computer and the tape server wherein said medium changer commands comprise an inquiry to read element status and the volume of memory in a slot of the small computer system interface bus;

means for transforming the medium changer commands of the personal computer to commands compatible with the library manager to read a logical tape volume of substantially identical size from an available memory pool in the tape server; and means for providing the transformed drive commands and library commands to the library manager.

* * * * *

UNITED STATES PATENT AND TRADEMARK OFFICE
CERTIFICATE OF CORRECTION

PATENT NO.    : 6,785,744 B2
DATED         : August 31, 2004
INVENTOR(S)   : Day, III et al.

It is certified that error appears in the above-identified patent and that said Letters Patent is hereby corrected as shown below:

Title page,
Item [75], Inventors, delete "Kenneth Fairclough" as the first named inventor, and insert -- Kenneth Fairclough Day, III --.

Column 8,
Line 30, delete "sewer", and insert -- server --.

Column 9,
Line 46, delete "sewer", and insert -- server --.

Column 10,
Line 51, delete "sewer", and insert -- server --.
Line 64, delete "forte", and insert -- for the --.

Signed and Sealed this

Twentieth Day of September, 2005

JON W. DUDAS
*Director of the United States Patent and Trademark Office*